United States Patent
Nam et al.

(10) Patent No.: US 9,097,215 B2
(45) Date of Patent: *Aug. 4, 2015

(54) EXHAUST GAS CONTROLLING METHOD OF ENGINE

(75) Inventors: Kihoon Nam, Gunpo (KR); Myoungho Sunwoo, Seoul (KR); Minkwang Lee, Seoul (KR); Yeongseop Park, Seoul (KR); Byounggul Oh, Hwaseong-si (KR)

(73) Assignees: HYUNDAI MOTOR COMPANY, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 879 days.

This patent is subject to a terminal disclaimer.

(21) Appl. No.: 13/236,424

(22) Filed: Sep. 19, 2011

(65) Prior Publication Data

US 2012/0138028 A1 Jun. 7, 2012

(30) Foreign Application Priority Data

Dec. 6, 2010 (KR) .................. 10-2010-0123612

(51) Int. Cl.
*F02M 25/07* (2006.01)
*F02D 41/00* (2006.01)
*F02D 41/18* (2006.01)
*F02D 41/14* (2006.01)

(52) U.S. Cl.
CPC ....... *F02M 25/0754* (2013.01); *F02D 41/0072* (2013.01); *F02D 41/18* (2013.01); *F02D 2041/1434* (2013.01); *F02D 2200/0402* (2013.01); *F02M 25/0718* (2013.01); *F02M 25/0727* (2013.01); *Y02T 10/47* (2013.01)

(58) Field of Classification Search
CPC ............ F02D 41/0047; F02D 41/0072; F02D 2009/0276; F02M 25/0777; F02M 25/078; F02M 25/0781; G01M 15/102; G01M 15/104; G01M 15/106
USPC .................. 123/568.11–568.22; 701/108; 73/114.74, 114.75, 114.76
See application file for complete search history.

(56) References Cited

U.S. PATENT DOCUMENTS

| | | | | |
|---|---|---|---|---|
| 5,934,249 | A | * 8/1999 | Nanba et al. | 123/350 |
| 6,019,094 | A | * 2/2000 | Itoyama | 123/676 |
| 6,802,302 | B1 | * 10/2004 | Li et al. | 123/568.16 |
| 6,886,334 | B2 | * 5/2005 | Shirakawa | 60/602 |
| 8,201,442 | B2 | * 6/2012 | Osburn et al. | 73/114.74 |
| 8,738,273 | B2 | * 5/2014 | Nam et al. | 701/108 |
| 2012/0138027 | A1 | * 6/2012 | Nam et al. | 123/568.21 |

FOREIGN PATENT DOCUMENTS

| | | |
|---|---|---|
| JP | 3805840 B2 | 5/2006 |
| KR | 10-0887968 B1 | 3/2009 |
| WO | WO 2008/118660 A1 | 10/2008 |

* cited by examiner

*Primary Examiner* — Hieu T Vo
*Assistant Examiner* — Sherman Manley
(74) *Attorney, Agent, or Firm* — Morgan, Lewis & Bockius LLP

(57) ABSTRACT

An exhaust gas control method of an engine may include calculating a target mass flux of EGR gas by using air mass entering into a cylinder and target air mass supplied into the engine, calculating a target effective flow area ($EFA^d$) of the EGR valve by using the target mass flux of the EGR gas and front/rear condition of the EGR valve, and calculating a valve opening rate of the EGR valve by using a predetermined curve fitting formula and the target effective flow area ($EFA^d$).

6 Claims, 4 Drawing Sheets

FIG. 3

① → Intake air manifold model

Target EGR mass flux → $\dot{m}_{EGR}^d = \dot{m}_a - MAF^d$ $$\dot{m}_a = \frac{n_v \cdot P_{int} \cdot V_d \cdot N}{120}, \quad P = \frac{P_{int}}{R \cdot T_{int}}$$

② → Inverse valve flow model $$EFA = \dot{m}_{egr}^d \frac{\sqrt{R_{exh} T_{exh}}}{P_{exh}} \cdot \frac{1}{PR^{\frac{1}{k}} \sqrt{\left\{\frac{2k}{k-1}\left(1-(PR)^{\frac{k-1}{k}}\right)\right\}}}, \quad (\text{if } PR > P_{CR})$$

③ → poppet valve model

EGR valve lift = $P_1 + P_2 \cdot EFA^d + P_3 \cdot (EFA^d)^2 + P_4 \cdot (EFA^d)^3$

EXHAUST GAS CONTROLLING METHOD OF ENGINE

CROSS-REFERENCE TO RELATED APPLICATION

This application claims priority to and the benefit of Korean Patent Application No. 10-2010-0123612 filed Dec. 6, 2010, the entire contents of which application is incorporated herein for all purposes by this reference.

BACKGROUND OF INVENTION

1. Field of Invention

The present invention relates to an exhaust gas control method that recirculates the exhaust gas of an exhaust line to an intake line and precisely controls the flux of the EGR gas.

2. Description of Related Art

Generally, an exhaust gas recirculation system is provided in most diesel engines that are equipped in a vehicle so as to take action with regard to exhaust gas regulations.

The exhaust gas recirculation system returns some of the exhaust gas exhausted from an engine to an intake device of a cylinder to lower combustion temperature of the engine and to decrease NOx thereof.

An EGR valve and an EGR cooler are disposed such that the EGR gas is cooled to a predetermined temperature to be supplied to the intake manifold.

The rotation speed of the engine and fuel injection amount are applied and the EGR valve is controlled by a feed forward control method so as to control the flux of the EGR gas, and a MAF detects the flux of the EGR gas.

Meanwhile, the flux of the EGR gas that is determined by the rotation speed and the fuel injection amount of the engine can be varied by several factors such that a real flowing of the EGR gas cannot be reflected and a feedback control can be interfered in a particular condition.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an exhaust gas control method of an engine having advantages of precisely controlling flux of exhaust gas that is recirculated from an exhaust line to an intake line, reducing a fuel consumption, and improving quality of exhaust gas.

One aspect of the present invention is directed to an exhaust gas control method of an engine may include calculating a target mass flux of EGR gas by using air mass entering into a cylinder and air mass supplied into the engine, calculating an effective flow area (EFA) of the EGR valve by using a target mass flux of the EGR gas and front/rear condition of the EGR valve, and calculating a valve opening rate of the EGR valve by using a predetermined curve fitting formula and the effective flow area (EFA).

The target mass flux of the EGR gas may be calculated by the following formula:

$$\dot{m}_{egr}^{d} = \dot{m}_a - MAF^d$$

Here, $\dot{m}_{egr}^{d}$ is a target mass flux of the EGR gas, $MAF^d$ is a mass flux of the intake air detected, $\dot{m}_a$ is a mass flux of the air entered into the cylinder.

The target effective flow area ($EFA^d$) is calculated by the following formula:

$$EFA^d = \dot{m}_{egr}^{d} \frac{\sqrt{R_{exh} T_{exh}}}{P_{exh}} \cdot \frac{1}{PR^{\frac{1}{k}} \sqrt{\left\{ \frac{2k}{k-1} \left( 1 - PR^{\frac{k-1}{k}} \right) \right\}}},$$

(if $PR > P_{CR}$)

Here, $R_{exh}$ is a gas constant of the exhaust gas, $T_{exh}$ is a temperature of the exhaust gas, PR is a front/rear pressure ratio of the EGR valve, k is a specific heat ratio, and $P_{CR}$ is a critical pressure ratio of the orifice flow (e.g., pressure).

The curve fitting formula is represented by the following formula:

EGR valve lift=$P_1 + P_2 \cdot EFA^d + P_3 \cdot (EFA^d)^2 + P_4 \cdot (EFA^d)^3$ Here, the EGR valve lift denotes a target valve opening of the EGR valve, $P_1$, $P_2$, $P_3$, and $P_4$ are constants, and the $EFA^d$ is a target effective flow area.

The $\dot{m}_a$ is $$\frac{\eta_V \cdot \rho_{int} \cdot V_d \cdot N}{120},$$

$\eta_V$ is a volumetric efficiency of a cylinder, $\rho_{int}$ is a density of intake air, and $V_d$ is a stroke volume of a cylinder, and N is an engine speed.

The $\rho_{int}$ is $$\frac{P_{int}}{R \cdot T_{int}},$$

R is a gas constant, and $T_{int}$ is a temperature of the intake air.

An exhaust gas control method of an engine according to various embodiments of the present invention calculates a target mass flux of EGR gas flowing an EGR line and applies an opening rate of the EGR valve thereby to control a flux of the EGR gas precisely and quickly.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 shows control factors in an exemplary exhaust gas control method of an engine according to various embodiments of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
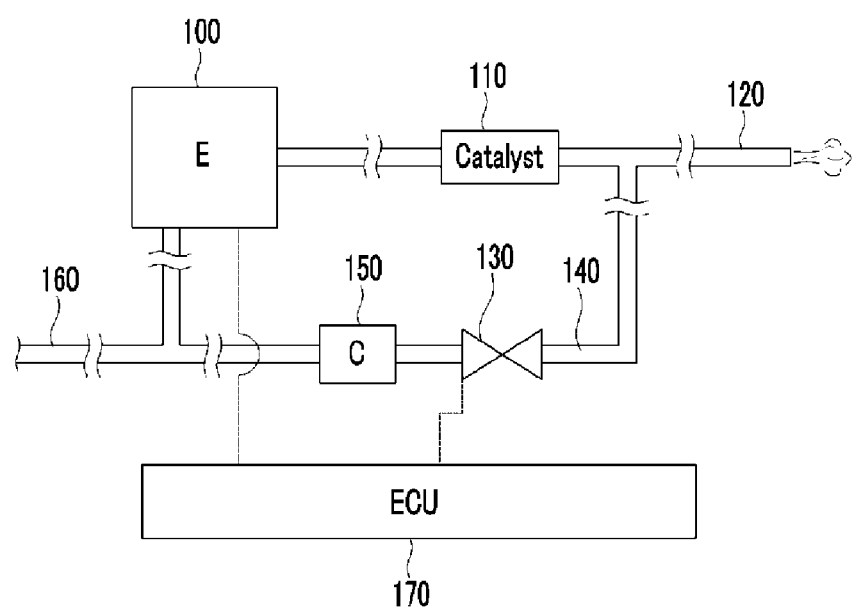
FIG. 1 is a schematic diagram of an exemplary exhaust gas control method of an engine according to various embodiments of the present invention.

FIG. 1 is a schematic diagram of an exhaust gas control method of an engine according to various embodiments of the present invention.

Referring to FIG. 1, an exhaust gas control method of an engine may include an engine 100, an exhaust line 120, a catalyst 110, an intake line 160, an EGR line 140, an EGR valve 130, an EGR cooler 150, and a control portion 170.

Further, it may include a pressure difference sensor that detects a pressure difference between a front and a rear of the EGR valve 130, a EGR flux detecting portion that detects a real flux of the EGR gas passing the EGR line 140, and an intake flux detecting portion that detects a real flux of the intake air passing the intake line 160.

The exhaust gas that is generated by the engine 100 is released outside through the exhaust line 120, harmful material is reduced by the catalyst 110, and a part thereof is recirculated to the intake line 160 through the EGR line 140.

The control portion 170 controls opening of the EGR valve 130 so as to precisely control the EGR gas flowing the EGR line 140.

Figure 2:
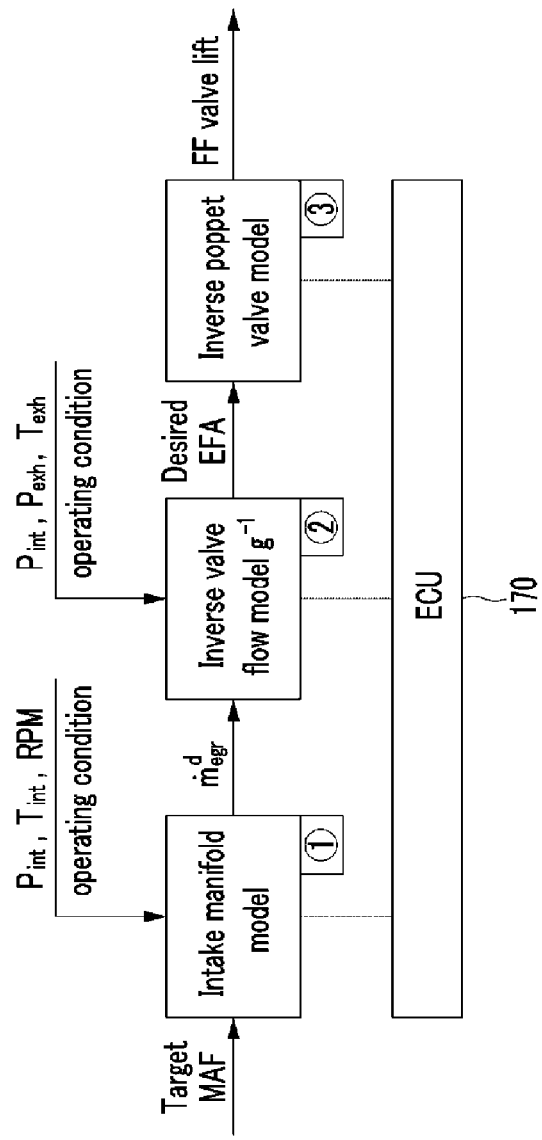
FIG. 2 is a flowchart showing an exemplary exhaust gas control method of an engine according to various embodiments of the present invention.

Referring to FIG. 2 and FIG. 3, a method for controlling the opening of the EGR valve will be detailed.

FIG. 2 is a flowchart showing an exhaust gas control method of an engine according to various embodiments of the present invention, and FIG. 3 shows control factors in an exhaust gas control method of an engine according to various embodiments of the present invention.

Referring to (1) of FIG. 2, an intake manifold model is shown, the control portion 170 detects an intake pressure ($P_{int}$), an intake air temperature ($T_{int}$), an engine speed (RPM) as driving conditions and then perform the intake manifold model. Here, a Target MAF denotes a target flux of the intake air.

Referring to (1) of FIG. 3, a target EGR mass flux means a target mass flux of the EGR gas flowing the EGR line 140, and $\dot{m}_{egr}^d$ is calculated by a target mass flux of the intake air ($MAF^d$) and a mass flux of the air inhaled by a cylinder ($\dot{m}_a$).

More particularly, a target mass flux of the EGR gas is calculated by the following formula.

$$\dot{m}_{egr}^d = \dot{m}_a - MAF^d \qquad \text{Formula 1}$$

Here, $\dot{m}_a$ is $$\frac{\eta_V \cdot \rho_{int} \cdot V_d \cdot N}{120},$$

$\eta_V$ is a volumetric efficiency of a cylinder, $\rho_{int}$ is a density of the intake air, $V_d$ is cylinder stroke volume, N is an engine speed, the $\rho_{int}$ is $$\frac{P_{int}}{R \cdot T_{int}},$$

R is gas constant, and $T_{int}$ is a temperature of the intake air.

Referring to (2) of FIG 2, an inverse valve flow model $g^{-1}$ signifies a flux model of the EGR, and the control portion 170 detects an intake pressure ($P_{int}$), an intake air temperature ($T_{int}$), and an engine speed (RPM) as driving conditions and perform the flux model of the EGR.

Referring to (2) of FIG. 3, the EGR mass model is calculated by a target mass flux of the EGR gas $\dot{m}_{egr}^d$.

More particularly, the EGR flux model is used to get a target effective flow area ($EFA^d$) of the EGR valve 130 and is calculated by the following formula:

$$EFA^d = \dot{m}_{egr}^d \frac{\sqrt{R_{exh} T_{exh}}}{P_{exh}} \cdot \frac{1}{PR^{\frac{1}{k}} \sqrt{\left\{\frac{2k}{k-1}\left(1 - PR^{\frac{k-1}{k}}\right)\right\}}}, \qquad \text{Formula 2}$$

(if $PR > P_{CR}$)

Here, $R_{exh}$ is a gas constant of the exhaust gas, $T_{exh}$ is a temperature of the exhaust gas, PR is a pressure ratio between a front and a rear of the EGR valve 130, k is a specific heat ratio, $P_{CR}$ is a critical pressure ratio of the orifice flow, and a temperature of the exhaust gas and the front/rear pressure difference of the EGR valve 130 are detected by a pressure difference sensor and a temperature sensor. A detailed description for the pressure difference sensor and the temperature sensor will be omitted in various embodiments of the present invention.

Referring to (3) of FIG. 2, an inverse poppet valve model is used to get a target opening of the EGR valve 130 and is calculated by the target EFA (effective flow area) that is calculated in the (2) of FIG. 3.

More particularly, a target opening rate of the EGR valve 130 is calculated by the following formula:

$$\text{EGR valve lift} = P_1 + P_2 \cdot EFA^d + P_3 \cdot (EFA^d)^2 + P_4 \cdot (EFA^d)^3 \qquad \text{Formula 3}$$

Here, the Formula 3 is a curve fitting formula that is made to be fitted to a graph that is drawn by experimental data, an EGR valve lift denotes a target valve opening of the EGR valve 130, $P_1$, $P_2$, $P_3$, and $P_4$ are constants, and the $EFA^d$ denotes a target effective flow area. Further, the curve fitting formula can be varied depending on a design specification of the valve.

A target valve opening of the EGR valve 130 that is calculated by the formula 3 is set to a target value of the feed forward control so as to control the opening of the EGR valve 130 in various embodiments of the present invention. In a FIG. 2, a FF valve lift as a feed forward control signifies controlling the opening rate of the valve.

Figure 4:
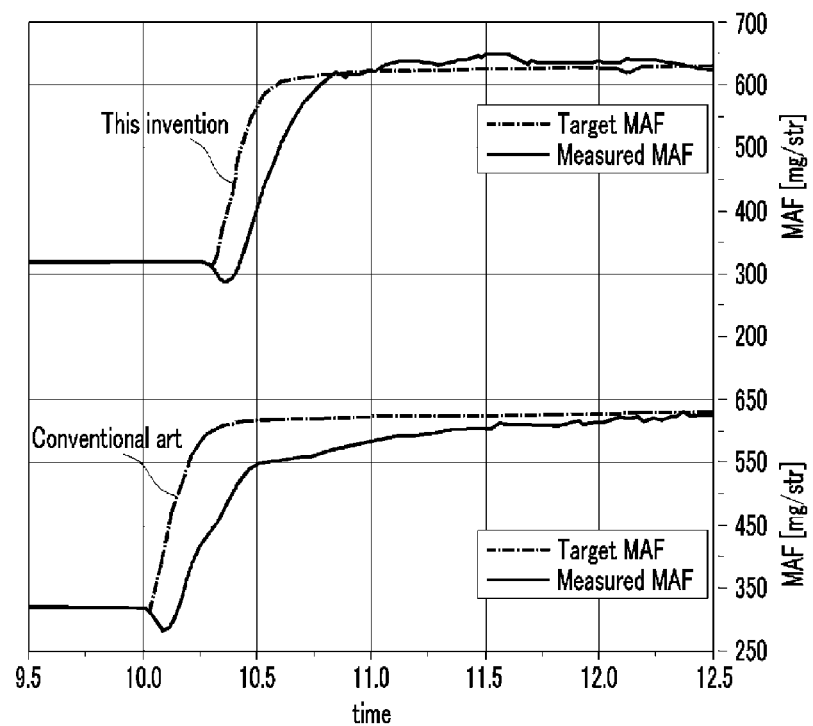
FIG. 4 is a graph showing effects by an exemplary exhaust gas control method of an engine according to various embodiments of the present invention.

FIG. 4 is a graph showing effects by an exhaust gas control method of an engine according to various embodiments of the present invention.

Referring to FIG. 4, a horizontal axis denotes time, a vertical axis shows a mass flux of the intake air (MAF) flowing the line 160.

As shown there, in a case that a control of the present invention is applied, a settling time is improved from about 1.43 to 0.45 second.

In other words, in a case that the control according to the present invention is applied, the EGR valve 130 quickly reacts such that the target mass flux of the EGR gas is quickly realized.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust gas control system of an engine, the system comprising:
   an EGR line that recirculates exhaust gas of an exhaust line to an intake line;
   an EGR valve that is disposed on the EGR line to control the recirculated exhaust gas; and
   an ECU that is configured to control the EGR valve according to a driving condition, wherein the ECU performs:
      calculating a target mass flux of EGR gas by using air mass entering into a cylinder and air mass supplied into the engine;
      calculating a target effective flow area ($EFA^d$) of the EGR valve by using a target mass flux of the EGR gas and front/rear condition of the EGR valve; and
      calculating a valve opening rate of the EGR valve by using a predetermined curve fitting formula and a target effective flow area ($EFA^d$);
   wherein the target mass flux of the EGR gas is calculated by the following formula:
   $$\dot{m}_{egr}^d = \dot{m}_a - MAF^d$$
   wherein $\dot{m}_{egr}^d$ is a target mass flux of the EGR gas, $MAF^d$ is a target mass flux of the intake air detected, $\dot{m}_a$ is a mass flux of the air entered into the cylinder;
   wherein the $\dot{m}_a$ is
   $$\frac{\eta_V \cdot \rho_{int} \cdot V_d \cdot N}{120},$$
   $\eta_V$ a volume efficiency of a cylinder, $\rho_{int}$ is a density of intake air, and $V_d$ is a stroke volume of a cylinder, and N is an engine speed; and
   wherein the curve fitting formula is as follows:
   $$\text{EGR valve lift} = P_1 + P_2 \cdot EFA^d + P_3 \cdot (EFA^d)^2 + P_4 \cdot (EFA^d)^3$$
   wherein the EGR valve lift denotes a target valve opening of the EGR valve, $P_1$, $P_2$, $P_3$, and $P_4$ are constants, and the $EFA^d$ is a target effective flow area.

2. The exhaust gas control system of claim 1, wherein the target effective flow area (EFA) is calculated by the following formula:
$$EFA^d = \dot{m}_{egr}^d \frac{\sqrt{R_{exh} T_{exh}}}{P_{exh}} \cdot \frac{1}{PR^{\frac{1}{k}} \sqrt{\left\{\frac{2k}{k-1}\left(1 - PR^{\frac{k-1}{k}}\right)\right\}}},$$
(if $PR > P_{CR}$)

wherein $R_{exh}$ is a gas constant of the exhaust gas, $T_{exh}$ is a temperature of the exhaust gas, PR is a front/rear pressure ratio of the EGR valve, k is a specific heat ratio, and $P_{CR}$ is a predetermined threshold value.

3. The exhaust gas control system of claim 1, wherein the $\rho_{int}$ is
$$\frac{P_{int}}{R \cdot T_{int}},$$

R is a gas constant, and $T_{int}$ is a temperature of the intake air.

4. An exhaust gas control method of an engine, comprising:
   calculating a target mass flux of EGR gas by using air mass entering into a cylinder and air mass supplied into the engine;
   calculating a target effective flow area ($EFA^d$) of the EGR valve by using a target mass flux of the EGR gas and front/rear condition of the EGR valve; and
   calculating a valve opening rate of the EGR valve by using a predetermined curve fitting formula and the target effective flow area ($EFA^d$);
   wherein the target mass flux of the EGR gas is calculated by the following formula:
   $$\dot{m}_{egr}^d = \dot{m}_a - MAF^d$$
   wherein $\dot{m}_{egr}^d$ is a target mass flux of the EGR gas, $MAF^d$ is a target mass flux of the intake air detected, $\dot{m}_a$ is a mass flux of the air entered into the cylinder;
   wherein the $\dot{m}_a$ is
   $$\frac{\eta_V \cdot \rho_{int} \cdot V_d \cdot N}{120},$$
   $\eta_V$ is a volume efficiency of a cylinder, $\rho_{int}$ is a density of intake air, and $V_d$ is a stroke volume of a cylinder, and N is an engine speed; and
   wherein the curve fitting formula is:
   $$\text{EGR valve lift} = P_1 + P_2 \cdot EFA^d + P_3 \cdot (EFA^d)^2 + P_4 \cdot (EFA^d)^3$$
   wherein the EGR valve lift denotes a target valve opening of the EGR valve, $P_1$, $P_2$, $P_3$, and $P_4$ are constants, and the $EFA^d$ is a target effective flow area.

5. The exhaust gas control method of claim 4, wherein the effective flow area (EFA) is calculated by the following formula:
$$EFA^d = \dot{m}_{egr}^d \frac{\sqrt{R_{exh} T_{exh}}}{P_{exh}} \cdot \frac{1}{PR^{\frac{1}{k}} \sqrt{\left\{\frac{2k}{k-1}\left(1 - PR^{\frac{k-1}{k}}\right)\right\}}},$$
(if $PR > P_{CR}$)

wherein $R_{exh}$ is a gas constant of the exhaust gas, $T_{exh}$ is a temperature of the exhaust gas, PR is a front/rear pressure ratio of the EGR valve, k is a specific heat ratio, and $P_{CR}$ is a predetermined threshold value.

6. The exhaust gas control method of claim 4, wherein the $\rho_{int}$ is
$$\frac{P_{int}}{R \cdot T_{int}},$$

R is a gas constant, and $T_{int}$ is a temperature of the intake air.

* * * * *